United States Patent Office 2,833,684
Patented May 6, 1958

---

2,833,684

PROCESS OF MAKING LAMINATED PLASTIC-IMPREGNATED PAPER TUBES

Joseph Horowitz, Hanson, Mass., assignor to Babbitt Pipe Co., Inc., West Hanover, Mass., a corporation of Massachusetts No Drawing. Application October 18, 1956
Serial No. 616,604

1 Claim. (Cl. 154—83)

The present invention relates to laminated reinforced plastic materials and a process for making the same.

A primary object of this invention is to provide a reinforced plastic material which will be substantially inert both to acid and alkali. Another object is to provide a reinforced plastic material which is less porous than the materials currently available.

These and other objects of my invention and the features thereof will be best understood by a detailed description of a preferred embodiment thereof, selected for purposes of illustration and described as follows.

In the preferred embodiment of my invention I employ as an important ingredient a thermosetting resin which is a copolymer containing approximately 60% vinyl chloride and 40% acrylonitrile having a curing temperature of approximately 280°–320° F. It is extremely inert both to acid and alkali, and has a further characteristic of tending to spread and form an impervious film when being heated and cured.

While the said resin has the above-mentioned desirable characteristics, it is also significant that these very same characteristics limit the means by which it may be used. Thus the said resin is not readily dissolved and cannot be easily employed in impregnating plastic reinforcing materials. In the preferred embodiment of my invention I am able to substantially to overcome this disadvantage by mixing approximately 15 pounds of the said resin with about 100 pounds of the solution of about 60% phenol formaldehyde resin and about 40% alcohol, which may be either isopropyl or methanol. When these substances are mixed, I notice a marked expansion of the granules of the said resin and while the said resin does not actually enter into solution it becomes substantially soft and gel like. I also find that the said resin is more readily and completely brought to this condition by heating the same to about 80° F. prior to admixture to the phenol solution.

After mixing the phenolic resin and the above said resin as above described, I apply the same to a fibrous reinforcing material, such as paper, felt or the like. During this application the phenolic resin tends to permeate the entire fibrous body, while the above said resin remains more predominantly on the surface thereof. However, since the above said resin is soft and gel like, it does substantially penetrate the interstices between the fibers to a less extent down into the fibrous body itself.

Having coated the fibrous body I then pass the same slowly through a long oven in which the temperature is maintained at about 250° F. This heat treatment serves the purpose of driving off the phenolic solvent and unwanted moisture present in the fibrous body.

After passing through the oven, the impregnated fibrous material is ready for forming into desired shapes, and the resin may be regarded as occupying the so-called "B" stage in which the resin is substantially soft, pliable and uncured.

The impregnated material of the preferred embodiment of my invention is preferably wrapped around mandrels and formed into cylindrical pipes containing helically wound overlapping layers of impregnated paper. While this form of end use is particularly well suited to my invention, it will be understood that the material may be adapted for molding into different articles and shapes, and accordingly it is not my intention to limit the scope of this invention to the precise subject matter of cylindrical pipe.

Once the desired article has been formed, the resins are cured under heat and pressure. If the porosity is not a critical problem, it is satisfactory to form the pipe under 100 p. s. i. at about 340° F. for about 3–5 minutes in a die. However, forming the pipe under 1000 p. s. i. renders the pipe very strong and impervious. In addition to the foregoing, a post cure at 300° F. for about 4 hours insures a much more complete polymerization of the resins, and thereafter the resulting pipe, whether formed under the low or high pressure, will withstand a rigorous acetone test without showing any substantial signs of solubility. A post cure at a higher temperature but just below the carbonization temperature of the above said resin of about 450° F. for about 15 minutes has been performed and the results have likewise been highly satisfactory.

The pipe which results from the foregoing process is extremely inert and strong. Its acid and alkaline resistance is very high and even when formed under the low pressure the pipe is substantially non-porous.

A principal characteristic of the pipe formed by the foregoing method is the fact that the above said resin and phenolic resin appear to be present in a cross-linked or polymerized state. I conclude this from washing tests in which I have compared the material of my invention in boiling water to materials containing only fibers and cured phenolic resin. The combination of my invention is in no way washed out by boiling water, whereas the simple phenolic composition shows clear deterioration in the presence of boiling water. This chemical change, however, does not become apparent until the resins are cured under pressure and heat. Accordingly, it is my intention to claim this material broadly, and for this reason I do not wish to be limited to the precise percentages disclosed in the preferred embodiment described above. I have lowered the above said resin percentage with successful results, but below 7% the beneficial results herein described are not significant. On the other hand, 33% of the above said resin is entirely satisfactory, and 50% is still feasible. The upper threshold is the percentage at which the laminations no longer adhere adequately, and I consider this to be about 60%.

Having thus disclosed and described a preferred embodiment of my invention, what I claim as new and desire to secure by Letters Patent of the United States is:

The process of making laminated reinforced substantially non-porous plastic tubes which comprises mixing 100 pounds of a solution of 60% phenol formaldehyde resin and 40% alcohol with between 7 and 60 pounds of a thermosetting copolymer of approximately 60% vinyl chloride and 40% acrylonitrile, at about 80° F., spraying said mixture onto paper whereby said phenolic resin penetrates the paper fibers and said copolymer penetrates said paper fibers to a less extent and remains primarily on the surface thereof, baking said sprayed paper for about 30 minutes at about 250° F. to evaporate moisture in said paper, to eliminate said alcohol, and to cause said resin to enter the "B" stage thereof, laminating said paper, forming said paper into a tube containing a plurality of laminations, and curing said resin under a pressure of about 1,000 p. s. i. while heating the same to about 340° F. for about 4 minutes whereby said resin and said copolymer become chemically linked, and thereafter baking said tube at about 300° F. for about 3 hours.

References Cited in the file of this patent

UNITED STATES PATENTS

| | | |
|---|---|---|
| 2,459,739 | Groten et al. | Jan. 18, 1949 |
| 2,564,695 | Johnson et al. | Aug. 21, 1951 |
| 2,672,456 | Gayler | Mar. 16, 1954 |

FOREIGN PATENTS

| | | |
|---|---|---|
| 615,332 | Great Britain | Jan. 5, 1949 |

OTHER REFERENCES

"Vinyon—A New Textile Fiber," American Wool and Cotton Reporter; February 1, 1940; pp. 13 and 14.